United States Patent [19]
Lowey et al.

[11] 3,710,914
[45] Jan. 16, 1973

[54] RIVETLESS FRICTION PAD FOR AIRCRAFT BRAKES

[75] Inventors: Francis J. Lowey; John E. Gerding, both of Medina, Ohio

[73] Assignee: Friction Products, Co., Medina, Ohio

[22] Filed: Dec. 18, 1971

[21] Appl. No.: 176,420

[52] U.S. Cl.............192/107 R, 188/218 XL, 85/39, 29/512
[51] Int. Cl..............................................F16d 13/68
[58] Field of Search..........192/107 R, 107 C, 107 M; 188/218 XL, 250 G; 85/39; 24/216, 217, 220

[56] References Cited

UNITED STATES PATENTS

| | | | |
|---|---|---|---|
| 1,789,133 | 1/1931 | Bluhm | 192/107 R |
| 2,806,570 | 9/1957 | Markus | 188/218 XL |
| 3,464,310 | 9/1969 | Lambert | 85/39 |
| 3,685,623 | 8/1972 | Bradshaw | 192/107 R |

*Primary Examiner*—Benjamin W. Wyche
*Attorney*—T. Alcott TeGrotenhuis

[57] ABSTRACT

Rivetless friction components for brakes, clutches, etc., comprising a plurality of replaceable friction pads assembled rigidly on a disc-like support by fastening means comprising a pair of cooperating elements each having an annular body portion with a radially extending enlargement or flange at one end, an axially extending annular deformable lip at the other end, and a groove adjacent said lip, the said groove in one element being disposed radially inward of said lip and that of the other element being radially outward, one wall of each groove being an axially extending wall of said lip and the other wall being inclined with respect to both the axis and radii of said body portion, lips and said grooves in each element being positioned so that the diameter of the lip in each element corresponds to that of a region of the inclined wall near the free edge thereof, of the other element whereby said lips are deformed into interlocking relationship when said elements are forced axially together. The transverse cross-sectional size and shape of said body portion corresponds to mounting openings formed in said support and in a metal backing of said pads. The said flange overlies an edge of openings in said backing and the flanged end may be covered by and bonded to a continuous layer of friction material bonded to said backing of the pads. The increased area and more uniform-frictional heating extends the life of the frictional component.

9 Claims, 4 Drawing Figures

PATENTED JAN 16 1973

3,710,914

INVENTORS
FRANCIS J. LOWEY
JOHN E. GERDING
BY
Theodore A. TeGrotenhuis
ATTORNEY

RIVETLESS FRICTION PAD FOR AIRCRAFT BRAKES

This invention relates to friction components for aircraft brakes and clutches, and brakes for vehicles, machinery and the like. It particularly relates to friction components comprising separately formed pads comprising sintered and compressed powdered metal that are fastened to a backing member or support without the use of the usual rivets or fastening means which decreases the area of friction material, available for wear.

Aircraft brakes as well as certain clutch and brake mechanisms utilized in heavy machinery and vehicles, have brakes with friction components made-up from a series of metallic friction pads riveted to a suitable support that is attached to or carried by one of the relatively rotatable or sliding members.

In certain aircraft brakes, friction pads are riveted to a supporting member so that they can be removed or replaced at required intervals without destroying the supporting element of the brake component. In order to dissipate energy involved in braking of aircraft and heavy vehicles, very good contact is required between the metal supporting member or disc and the friction pads. When friction pads are fastened by rivets, a substantial portion of the surface available for wear is eliminated by the space required for the fastening means, this greatly decreases the life of the friction elements.

It is therefore an object of the present invention to provide friction components available for use in aircraft brakes, clutches and brakes of various types which comprise removeable and replaceable pads of metallic friction material that are fastened to the backing without decreasing the total friction surface available for wear.

Another object of the present invention is to provide a method of making brake and clutch components comprising separately formed pads of friction material wherein, the pads of friction material are assembled to a backing member securely without the use of rivets, welding and the like, and wherein the assembly may be made in a rapid and convenient manner.

A further object of the present invention is to provide a pair of fastening elements that may be coupled together, in a permanent manner by the use of force alone.

A still further object of the present invention, is to provide friction components useable in aircraft brakes which component has increased service life, and has readily replaceable friction pads.

Other objects will be apparent from the following description of the invention as illustrated by the accompanying drawing in which.

Figures 1, 2, 3, 4:
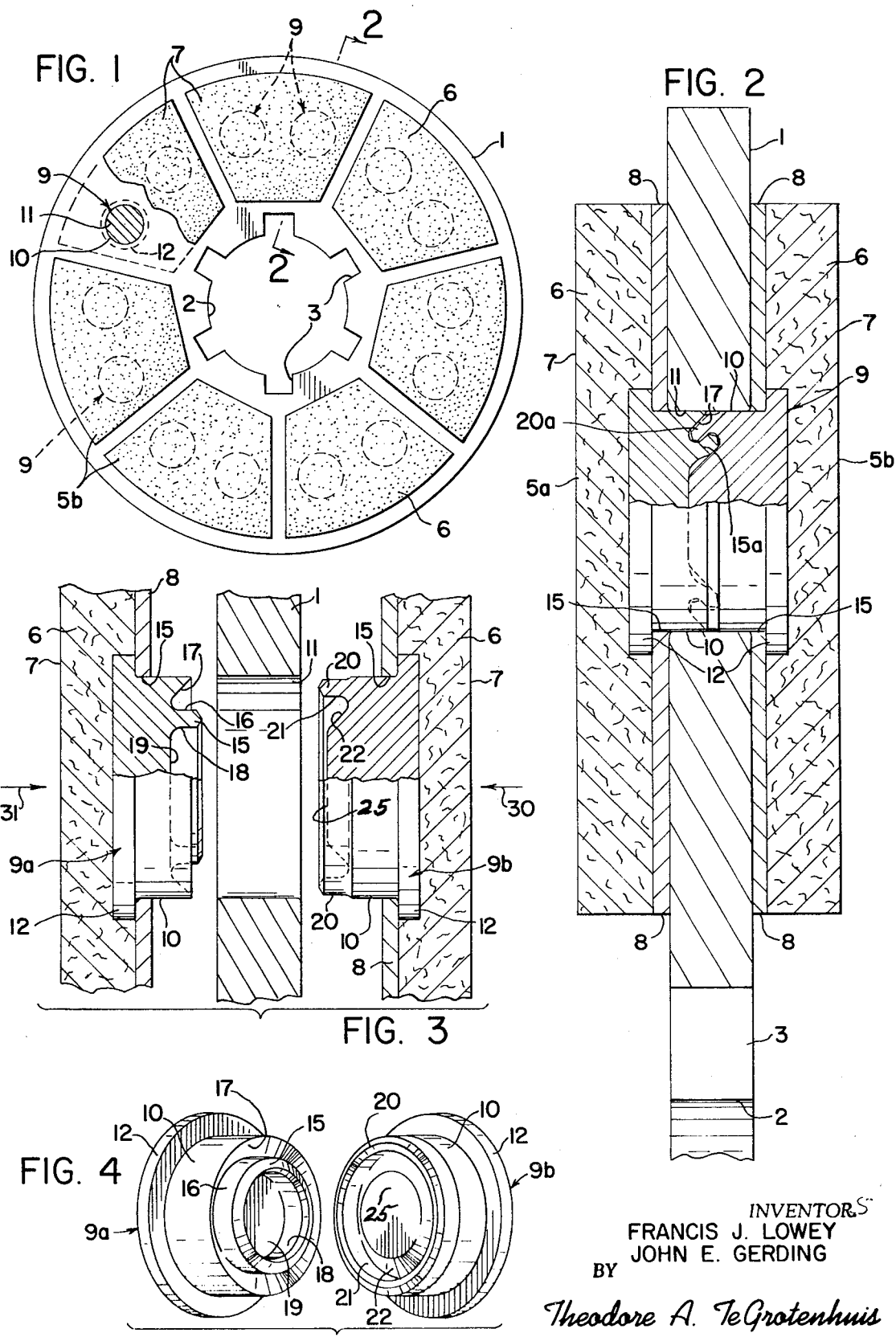
FIG. 1 is a side elevational view, of a disc-type friction component of the present invention.
FIG. 2 is a sectional view on line 2—2 of FIG. 2, through a portion of the friction component of FIG. 1.

FIG. 3 is a sectional view through portion of the separate elements which are assembled together in making the friction components of FIG. 1, showing the fastening means partly in section and in their originally formed state, prior to being pressed together to couple the friction pads to the backing or support member; and FIG. 4 is a perspective view of the pair of fastening elements which interlock with each other, when they are pressed together in a suitable manner.

Referring more particularly to the drawings in which like-parts are designated by like-numerals of reference throughout the several views, the friction components of the brakes or clutches comprise a supporting member 1, a plurality of pads 5a and 5b and means for fastening the pads to the supporting member. The supporting member 1 is generally in disc-like form, having a central opening defined by the wall 2 for receiving the shaft carrying one of the relatively rotatable members of the brake or clutch and has means such as the keyways or slots 3 for cooperating with splines (not shown) on one of the relatively rotatable members so that the member 1 is moveable therewith. The supporting member 1 is also provided with a plurality of spaced openings or holes 11 to receiving the fastening means for fastening the series of friction pads 5a and 5b respectively to the supporting member 1. Each of the pads 5a and 5b comprise a backing 8, which is preferably a portion formed from a flat sheet of solid hot or cold rolled steel, and a layer of friction material 6 which is preferably a compressed and sintered mixture of metal powder and suitable friction and lubricating components such as silica and graphite respectively, and means 9 for fastening the pads together and to the supporting member 1.

The particular composition of the friction material 6 or the generally flat backing 8, and the particular way in which the backing 8 is firmly bonded to the friction material 6 is not part of the present invention. The metal powder sintered in the friction material is preferably largely or entirely copper because of its superior conductivity, but iron powder is often used. The backing is usually bonded to the compressed friction material by first coating the surface of the backing 8 to be bonded with a flash coating of copper, and then sintering the compressed powdered mixture with the aid of applied pressure against the coated surface in an inert atmosphere such as $H_2$, $CH_4$, etc.

In the brake or clutch assembly, the outer flat surface of the friction material 6 is adapted to bear strongly against a metal disc or sliding surface (not shown) attached to the second relatively rotatable member when the brakes are applied or the clutch is engaged.

In accordance with the present invention, the fastening means 2 comprises the cooperating fastening elements 9a and 9b which are adapted to interlock permanently with each other when suitably pressed together in an axial direction.

Each of the elements 9a and 9b of the fastening means comprises a body portion 10 of a size and shape to fit snugly within an opening 11 in the supporting member 1, a flange portion that extends in a lateral or radial direction from the body 10 at one end thereof. The flange portion 12 is preferably much thinner axially than the thickness of the friction material 6 and in the assembled friction pad, overlies the edges of the opening 15 in the backing 8 of the pad. Each of the cooperating elements in their as formed state, as shown by FIGS. 3 & 4, comprise a deformable rib or lip portion, which is preferably annular and protrudes or extends in a longitudinal or axial direction from the flange-free face of the respective body portion 10, i.e., from the face of the body 10 opposite the end carrying the flange 12, and an adjacent groove having one-wall thereof formed by a generally axially extending surface of the adjacent lip and the opposite wall inclined both with respect to radii and the axis of said body 10. The lip in each element of the fastening means is positioned to bear against an upper portion of the inclined surface of the inclined wall of the groove in the cooperating element, when the flange-free ends of the elements are strongly pressed together so that the lips are deformed by the inclined surface to interlock with each other as shown by FIG. 2. Thus, referring to element 9a, the axial flange-free surface thereof is provided with the axially extending deformable rib or lip 15 and an adjacent groove defined by the cooperation of the surface 16, which extends in a generally axial direction and is a side-surface of the adjacent rib or lip, with the inclined surface 17. The cooperating element 9b of the fastening me means is provided with the axially extending rib or lip 20 and an adjacent groove defined by cooperation of a wall 21, which is a side of the lip or rib 20 that extends in an axial direction, with the inclined surface 22. The lips and grooves in each of the fastening elements are preferably annular and the inclined surface 17 is of a diameter to contact, at its most axially extended region (the region of about maximum diameter), the lip 20 of the element 9b, when the elements 9a and 9b are pressed axially together as indicated by the arrows 30 and 31. The inclined surface 22 is of a diameter and position to similarly contact, in its most axially extended region or region of about minimum diameter, the end of the lip 15 of element 9a when the elements 9a and 9b are pressed together. The ends of the lips or ribs 15 and 20 are preferably bevelled as shown to facilitate deformation by the cooperating inclined surfaces. As may be seen, the inclined surface in one of the element is inclined in an outwardly direction from the bottom of the groove; whereas in the other element, the surface is inclined in inwardly (toward a lesser diameter) from the bottom of the groove. One of the elements 9a, is provided with a central cavity in the free-end thereof to receive a portion within the circumference of inclined annular wall 22. The central cavity is defined by the inner wall 18 of the rib 18 and the bottom 19, and is of a size and shape to receive the central-end portion 25 of the cooperating element 9b when the rib 15 is deformed as shown by 15a in FIG. 2.

When the elements of the fastening means are pressed strongly together in an axial direction in the direction of the arrows 30 and 31, the lips 15 and 20 are deformed and bent by the inclined surfaces 22 and 17 respectively to the interlocking form 15a and 20a of FIG. 2.

Although the fastening elements may be formed or coined from solid metal, they are preferably formed by compressing metal powder formulated for strength, for example, of iron or iron alloy and devoid of appreciable abrasive substances. They may, however, comprise abrasive substances and act as additional friction material when the pads are sufficiently abraded by wear.

In the manufacture of the pads 5a and 5b, the fastening elements 9a and 9b may be first separately shaped by suitably compressing metal powders in a mold under suitable pressure which may be several thousands of tons per square foot, they may then be assembled on the backing 8 that has been previously flash-coated with copper, and the friction material in unsintered form assembled thereon. The friction material 6 may be shaped on the backing directly from the uncompressed powder or it may be pre-shaped by compression but be unsintered. The unsintered friction material 6 and unsintered fastening means assembled on the backing member may then be assembled in a suitable sintering furnace suitably equipped with a ram for maintaining pressure between the surfaces to be bonded and sintered by heating under inert atmosphere to suitable sintering temperature as customarily used for making articles of powdered metal.

The pads as thus prepared, are simply assembled with pads 5a on one side of the supporting member 1 and pads 5b on the other side and with the body portions 10 protruding into the openings 11 of the member 1. Pressure is then applied against the friction surfaces 7 forcing the pads together against the supporting member whereupon, they become permanently attached thereto until purposely removed by suitable apparatus.

In as much as no rivet openings are required and all portions of the friction material are subjected to the heat caused by friction, the friction materials of the present invention have much longer life than heretofore.

It will be understood that the above description is by way of illustration rather than limitation, and that in accordance with the provisions of the Patent Laws variations and modifications of the invention may be made without changing the spirit thereof.

Having described my invention, I claim:

1. A friction component for brakes, clutches and the like comprising a disc-like metal supporting member adapted to be non-rotatively carried with respect to one of two relatively rotatable members, said supporting member having a plurality of spaced openings transversely therethrough, a plurality of friction pads each comprising a layer of friction material of compressed and sintered powdered metal-base composition, a backing of metal having at least one opening therethrough, said layer of friction material being bonded to said metal backing, and means for fastening said pads to said support, said fastening means comprising a pair of cooperating fastening elements each element of said pair having a body portion having size and configuration corresponding in transverse cross-section to said openings through said support and through said backing, an outwardly extending flange at one end of said body portion bearing against a lateral surface of said backing adjacent the said opening therethrough and adjacent said layer of friction material, an annular lip extending from the unflanged end of said body, and an adjacent annular groove adjacent said annular lip, one wall of said groove being a side edge of said lip and an opposite wall of said groove being inclined with respect to both the axis of said body portion and to radii thereof, the radius of the base of said lip and the radius of inclined surfaces of the said groove in each element of said pair being different, the groove in one of said elements of said pair having a smaller radius than the radius of the base of said annular lip thereof, and the groove in the other element of said pair having a larger radius than the base of said lip of that element, the diameter of the base of said lip in each element corresponding to the diameter of the inclined surface of the groove in the other element of said pair at about the diameter of the upper edge portion thereof, said lips in said pair being deformed into interlocking relation with the lips of each element bearing against both an inclined side-wall of the deformed lip of the other element and against an inclined wall of the groove in such other element the total combined length of said body portions of said elements, being equal to the sum of the thickness of the backings and support through which said body portion passes.

2. A component according to claim 1 wherein, said layer of friction material in said pads overlies the outer flanged ends of said fastening means.

3. A component according to claim 2 wherein, said friction material is integrally bonded to said backing, and to the flanged end of the fastening element.

4. A component according to claim 3 wherein, a plurality of said pads comprising friction material are integrally fastened to each side of said support and the total unflanged length of the body portions of said fastening means corresponds to the total of the thickness of the backings of two pads and the thickness of the support.

5. The component of claim 4 wherein, the said fastening means is of compressed and sintered powdered metal, and wherein said backing and support are of solid ferrous metal.

6. A pair of pads for assembly to opposite sides of a suitable disc-like support having suitably spaced openings therethrough to provide a friction-component of brakes, clutches and the like, each of the pads in said pair comprising a plate-like metal backing of solid ferrous metal having at least one opening therein, a layer of compressed and sintered powdered metal base friction material and one of two cooperating elements of a pair that forms a fastening means, each of which cooperating elements having a body portion of a transverse cross-sectional shape corresponding to the said opening in said backing and a flange at one end of said body portion, said elements of fastening means being carried by said backing so that a portion of the body portion protrudes from one side of said backing through said opening and the said flange rests against the opposite side of said backing and against said layer of friction material which overlies and bears against the axial surface of the flanged end of said body portion, the unflanged end of said body portion of each of the elements of said pair having an axially extending deformable annular lip and an annular groove adjacent said lip, one side of said groove being a generally axially extending side-wall of said annular lip, the opposite side-wall of said groove being inclined to both radii and the axis of said body portion, the diameter of the said lips and of the inclined wall of grooves being different in each of the elements of said pair of elements in said fastening means, the groove in one of said elements being of smaller diameter than that of said lip thereof and the groove in the other element of said pair being of greater diameter than said lip thereof, the diameter of the lip in each element corresponding about to the diameter of the inclined wall of the groove in the other element of the pair in the region of its upper most portion so that when said elements of said pair are pressed strongly together in an axial direction with the lip of each element against the inclined surface of the cooperating element, the said lips are deformed to interlock with each other in hook-like manner with one side edge of a lip in each element bearing against a side of the lip and against an inclined wall of the cooperating element.

7. A product according to claim 6 wherein, said fastening means is also of sintered compressed metal powder.

8. Fastening means suitable for fastening wearing pads to a support having one or more suitable openings therethrough, said means comprising a pair of cooperating elements each of said elements having a body portion of generally cylindrical shape, a flange extending outwardly in a generally radial direction from one end of said body portion, an annular deformable lip extending axially from the unflanged end of said body and an annular groove adjaced said lip, one sidewall of said groove being a side of said lip and the opposite wall of said groove being of generally frusto conical shape being inclined to both the axis and to radii of said body portion, the groove in one element of said pair being of smaller diameter than said lip thereof and the groove in the other element of said pair being of greater diameter than that of said lip thereof, the diameter of the lip in each element corresponding about to that of the upper inclined wall of the groove in the other element, whereby when said elements are forced together in an axial direction, said lips are deformed into interlocking arrangement.

9. A method of making a pair of friction pads for brake components having replaceable wearing pads carried by a disc-like support, which comprises preparing a pair of fastening elements of a shape defined by claim 7 by compressing a metal powder with a force of several tons per square inch to make a preform, compressing a mixture comprising powdered metal and an abrasive to form an unsintered layer, assembling one of said preforms of said pair and said layer on a metal backing prepared for adhering to a layer of compressed powdered metal during the sintering of said layer, and sintering both said preform and said layer against said backing, assembling the second preform, a second layer of compressed and unsintered friction material mix on a second backing member and sintering the components together, whereby when said pads are pressed together with the said fastening elements protruding within openings in a support having a size and shape corresponding to the body portion of said fastening elements, the elements become permanently interlocked together.

* * * * *